United States Patent [19]

Moritomo et al.

[11] 4,006,953
[45] Feb. 8, 1977

[54] SPINDLE ASSEMBLY HAVING AN ELECTRODE SPINDLE

[75] Inventors: Sadao Moritomo, Ichikawa; Shinichi Kikuchi; Shigenori Ando, both of Narashino, all of Japan

[73] Assignee: Seiko Seiki Kabushiki Kaisha, Japan

[22] Filed: May 7, 1975

[21] Appl. No.: 575,130

[30] Foreign Application Priority Data

May 7, 1974 Japan .................. 49-51389[U]
May 10, 1974 Japan .................. 49-52081

[52] U.S. Cl. .................. 339/6 R; 339/112 L
[51] Int. Cl.² .................. H01R 39/00
[58] Field of Search ....... 339/6 R, 8 R, 8 L, 112 R, 339/112 L, 117 R, 117 P

[56] References Cited
UNITED STATES PATENTS 2,291,070  7/1942  Bruno ............... 339/8 R X Primary Examiner—W. Tupman
Assistant Examiner—DeWalden W. Jones
Attorney, Agent, or Firm—Robert E. Burns; Emmanuel J. Lobato; Bruce L. Adams

[57] ABSTRACT

A spindle assembly has a rotatable spindle which is electrically insulated from its housing by means of a moulded synthetic resin layer surrounding bearing holders. Electric current for effecting electrolytic grinding is supplied by a brush member which is in contact to the rear end of the spindle, the contact portion of the spindle and the brush having air circulating pathes for cooling and ejecting out powdered-brush-material and have radiating surfaces exposed to cooling air flow.

11 Claims, 4 Drawing Figures

SPINDLE ASSEMBLY HAVING AN ELECTRODE SPINDLE

BACKGROUND OF THE INVENTION

The present invention relates to a spindle assembly for such use as an electrolytic grinder or others, in which a rotatable spindle transmits sufficient electric current to the electrode on the spindle for electrolytic working the current, being supplied by a stationary brush member.

The electrolytic grinder has a metal-bonded grinding wheel as the negative pole and a work as the positive pole close to the grinding wheel, between which electrolyte flows through, conducting electric current from the work to the grinding wheel, so that the surface of the work is gradually dissolved to be removed by electrolysis reaction. It is usual for supplying the desired electric power to the rotating grinding spindle which has the metal-bonded grinding wheel, to use a slip-ring or electric current collector on the spindle and brushes in contact with the slip-ring or electric current collector.

A device having an electric power collector fixedly mounted on the rear end of the spindle and a static plug brush, an end surface of which is in contact with the collector end surface, has been in use. The device of this kind is superior to that of a slip-ring and a pair of brushes radially in contact with the slip-ring periphery, in that it possesses larger contact area of the brush with larger current capacity and in compactness.

But, in this kind of device there tends to occur dynamic pressure in the gap between flat friction surfaces of the electric collector and the brush, decreasing the contact pressure and bringing poor electric conductivity to the device. Furthermore, in case of supplying a cooling oil-mist to the brush device, it penetrates into the gap between the friction surfaces, making an oil film of non-conductivity therein.

For avoiding dynamic pressure and oil film in the gap of the friction surfaces, conventional brushes are provided with radial grooves on their friction surfaces. But, the grooves become soon filled with wear grain material of the brush and the material combined with oil will be formed into electric non-conductive film between the friction surfaces after a short-hour operation, by reason of so high temperature caused by electric current heating and friction heating accompanying poor air circulation and wear material rejection.

In order to prevent current leak and to ensure operators safety, it is necessary to insulate the spindle from the other members of the assembly. In the conventional apparatus, synthetic resin sheets have been inserted between the bearing holders and the spindle housing, fastening the sheets with them, or synthetic resin coated on the bearing holders which are fixed on the spindle housing.

In these prior art techniques, it is difficult to completely eliminate gap or space between the bearing holders and the spindle housing. In addition, it is necessary for safety to make the insulating sheet or coated film rather thick. Poor rigidity of the spindle results from these gap and thick sheet. It is another defect of the prior art that dielectric breakdown is apt to occur at the gap because of electrolyte penetration. Moreover, precise position assembling of the spindle is very difficult.

Ceramic insulators are also known, but are brittle and of bad machinability, resulting in lowering of the spindle accuracy.

BRIEF SUMMARY OF THE INVENTION

It is therefore the principal object of the present invention to provide a spindle assembly having a slipping brush device for supplying electric power to a rotating spindle, wherein wear material of the brush produced in the gap of the brush and the electric collector is forced to flow out, and, thereby, the formation of a wear matrial film prevented and good electric power supply is maintained.

It is another object of the invention to provide a spindle assembly having a slipping brush device for supplying electric power to a rotating spindle, wherein effective heat radiation occurs so as to prevent higher temperature rise in the slipping brush device.

It is furthermore another object of the invention to provide a spindle assembly having moulded synthetic resin layer filled in the gap between bearing holders and the spindle housing of the assembly, combining the holders and the housing in a body but electrically insulating perfect each other.

These and other objects are attained by a spindle assembly comprising a rotatable electrode spindle which has such a working tool as a metal-bonded grinding wheel or electrode on the nose and an electric current collect on the rear end thereof, a slipping brush member in contact with the collector behind it, air circulating pathes formed in the combination of the current collector and the brush member, a cooling air path which passes the circumference of the combination, and further moulded synthetic resin layer in the gaps between the spindle housing and the bearing holders which support the rotatable spindle.

BRIEF DESCRIPTION OF THE DRAWINGS

Further objects and features of the present invention will now be described reference being made to the attached drawings in which.

DESCRIPTION OF THE PREFERRED EMBODIMENT

Figure 1:
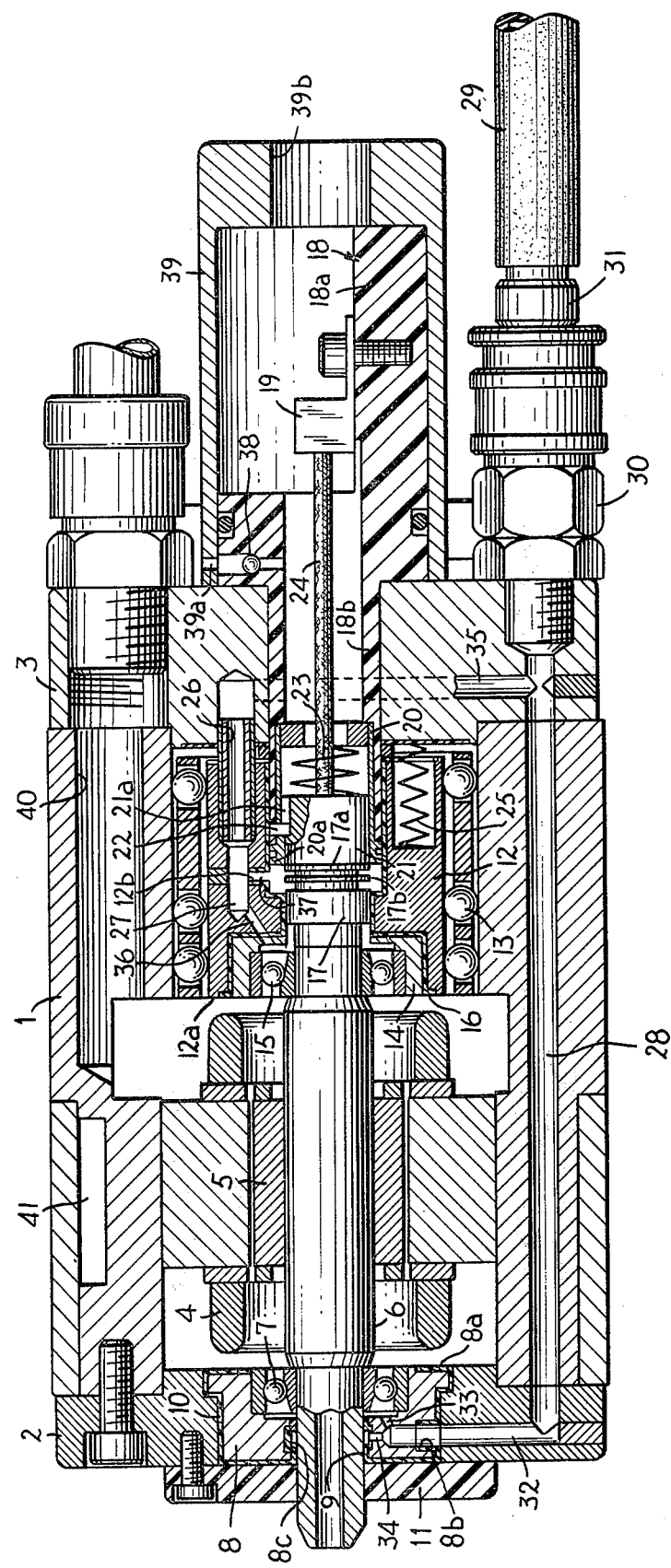
FIG. 1 shows a longitudinal sectional view of an embodiment of the invention.

Referring now to FIG. 1 showing an electrode spindle assembly for electrolytic grinder, having an electrode spindle driven by a high-frequency electric motor which is mounted on the housing thereof, numeral 1 designates a cylindrical spindle housing, a front flange 2 being securely fixed on the front end thereof, a rear flange 3 on the rear end. A high-frequency motor stator 4 is mounted on the forward half portion of the housing 1. A motor rotor 5 is coaxially spaced within the stator 4, being supported by a grinding wheel spindle 6.

A ball bearing 7, mounted on a bearing holder 8 which is fixed on said front flange 2, rotatably supports said grinding wheel spindle 6, the top nose of the spindle 6 penetrating the hole 9 of the bearing holder 8 to protrude from the front flange surface. A metal-bonded grinding wheel (not shown in the drawings) is mounted on the spindle nose.

Said bearing holder 8 is so spaced in the center opening of the front flange 2 that a small gap exists between the bearing holder 8 and the front flange 2, and thermosetting resin such as epoxy resin is poured and moulded therein forming electric insulating layer 10 which combines the front bearing holder 8 with the front flange 2 in a body, electrically insulating them from each other. The insulating layer 10 extends and spreads to cover over the front surface, the inside surface 8a of the bearing holder 8, and the inner wall of an oil-mist path 8b adjacent to the boundary between the bearing holder 8 and the housing 1, so as to prevent current leakage from the housing 1 to the spindle 6 through electrolyte film which would be formed with penetrated electrolyte, on adjacent side surfaces to the boundary. Further, the inner hollow surface 8c of the holder 8 is covered over with the insulating layer spread to make the leak prevention perfect.

A cover plate 11 is fixed on the front surface of the front flange 2, which is made of insulating material.

Numeral 12 designates a slidable sleeve which is supported in said housing 1 with a slide bearing 13 slidable in the axial direction of the spindle 6 and has therein a bearing holder 14.

A ball bearing 15 mounted on the bearing holder 14 rotatably supports the grinding wheel spindle 6 at its rear end portion.

The rear bearing holder 14 is so spaced in the cylindrical hollow of the slidable sleeve 12 that a small gap exists between the bearing holder 14 and the slidable sleeve, and thermosetting resin such as epoxy resin is poured and moulded therein forming electric insulating layer 16 which combines the rear bearing holder 14 with the slidable sleeve 12 in a single body, electrically insulating them from each other. The insulating layer 16 extends and spreads over the whole inner surface, the rear surface, and the portions of the front end surface 12a and a cooling air path wall 12b of the slidable sleeve 12 so as to prevent current leakage through electrolyte film on adjacent side surfaces to the boundary between the slidable sleeve 12 and the bearing holder 14 and, further, to insulate an electric current collector 17 and a radiation sleeve 18, which will be described hereinafter, from the slidable sleeve 12.

The rear end of the spindle 6 is projected into the hollow of said slidable sleeve 12 and is provided with the pluglike electric current collector 17 thereon. The current collector 17 has radiation fins 17b on the periphery thereof, which are exposed to cooling air flow from an exhaust nozzle 37.

Numeral 18 designates a brush holder made of electric insulating material such as phenol resin. Said brush holder 18 consists of a base portion 18a and a cylindrical portion 18b. The base portion 18a is provided with a connecting terminal 19 and is securely fixed on the end surface of the rear flange 3, the cylindrical portion 18b being projected into the hollow of the slidable sleeve 12 through the rear flange 3. A metallic radiation sleeve 20 is mounted on the front end of the brush holder cylindrical portion. The radiation sleeve 20 has radiating fins 20a around the top end thereof which surrounds a brush member 21, and protruding toward a cooling air path.

The brush member 21 is inserted in a slidable but unrotatable manner in said radiation sleeve 21, a key 22 protruded inside from the radiation sleeve 20 engaging with a key slot 21a on the brush member periphery. Said brush member 21 is spaced behind the current collector, and the front end surface of said brush member 21 is forced to be kept into contact to the rear end surface 17a of the current collector 17 by a spring 23 which is pressed in between the brush member 21 and an inner shoulder of the brush holder 18, so that electric current for electrolytic grinding is transmitted through the brush member 21 and the current collector 17 to the electrode spindle 6. The brush member 21 is connected to the connecting terminal 19 with a flexible electric wire 24.

Numeral 25 designates a spring to generate enough force for pressing the slidable sleeve 12, giving the desired pre-load on the ball bearings 7 and 15. The slidable sleeve 12 is prevented from rotation by a pipe 26, which is protrudingly fixed on the rear flange 3, inserting into an oil-mist path 27 in the sleeve 12 and forming itself a guide path for oil-mist.

Numeral 28 designates an oil-mist supplying main path from the rear flange 3 to the front flange 2 through the housing 1. An oil-mist hose 29 is connected to said main path 28 at the rear end through a coupling 30 and a plug 31, and the front end of the main path 28 is connected with an oil-mist front path 32 formed in the front flange 2. An exhaust nozzle 33 extends obliquely at the top end of the front path 32 to spout oil-mist toward the ball bearing 7. A branch of the oil-mist front path 32 is opened to the hole 9 forming a nozzle 34 facing to the spindle 6. Spouted oil-mist from the nozzle 34 seals the gap between the spindle 6 and the front bearing holder 8, a part of the oil-mist flowing to the bearing 7 and the rest outside.

Numeral 35 designates an oil-mist rear path formed in the rear flange 3. An end of the rear path 35 is connected to said main path 28, the other end to the path 27 in the slidable sleeve 12. The path 27 is, further, connected to an exhaust nozzle 36 to spout oil-mist toward the ball bearing 15 and to another exhaust nozzle 37 toward the current collector 17.

Thus, oil-mist supplyed from the hose 29 is distributed to lubricate the ball bearings 7 and 15, to cool the current collector 17 and the brush member 21, and to seal the front-bearing-holder spindle gap.

Numeral 38 designates a check-value spaced in the exhaust path of a cooling air path for preventing backward air flow in case the operation stops, i.e. the stoppage of the high-frequency motor driving and cooling air supply accompanying with air cooling and air volume reducing in the spindle assembly, which causes air and dirt suction.

The base portion 18a of the brush holder 18 is provided with a cover 39 which has an oil-mist exhaust hole 39a and an aperture 39b passing an electric wire, (not shown in the drawings) through, an end of which is connected to the connecting terminal 19.

Numeral 40 designates a hollow in the housing 1, which passes electric wires of the high-frequency motor stator 4.

A recess 41 on the periphery of the housing 1 surrounds the motor stator 4. Cooling water is successively introduced into the recess 41 to cool the spindle assembly at the motor, and flows outside.

Figure 2:
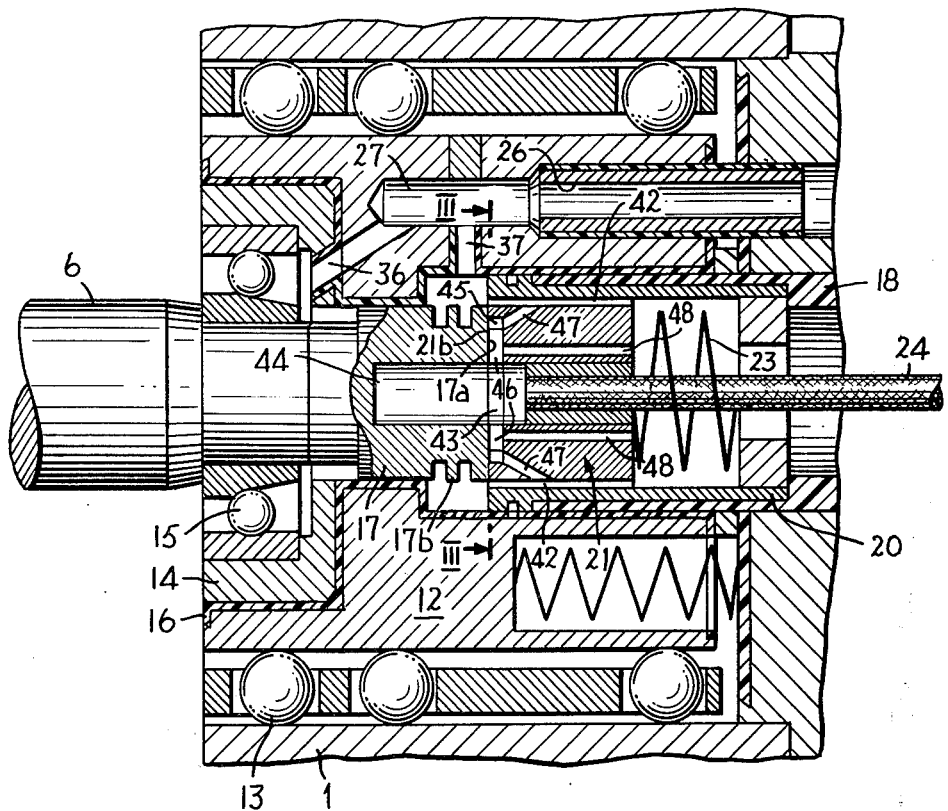
FIG. 2 shows a partially enlarged sectional view of the combination of the electric current collector and the slipping brush member in FIG. 1.

Referring now to FIG. 2, air circulating pathes in the combination of the current collector 17 and the brush member 21 for cooling them and ejecting wear material will be described.

Figure 3:
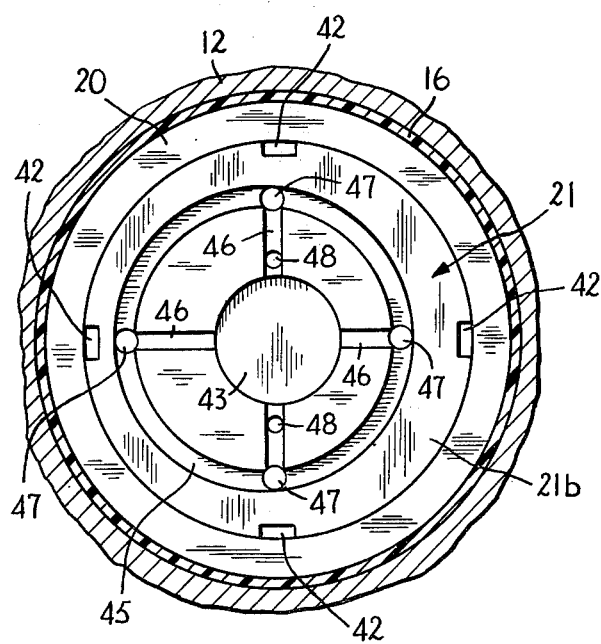
FIG. 3 shows a cross sectional view taken on line III—III in FIG. 2, illustrating an eccentric ring groove on the contact surface of the brush member.

The brush member 21 is provided with such a plurality of grooves and holes to permit fluid or worn and powdered material to flow through, as a plurality of longitudinal grooves 42, 42—, the number of which is, for example, four, on the periphery of the brush member for ejecting out oil-mist introduced from the exhaust nozzle 37, a hollow 43 opening in the front end surface 21b center corresponding with the center hole 44 of the current collector 17, an eccentric circular groove 45, as shown in FIG. 3, on the front end surface 21b, a plurality of radial grooves 46, 46— on the same surface 21b, which are, for example, four in number, each connecting said eccentric circular groove 45 with the center hollow 43, a plurality of through holes 47, 47— extending obliquely in the brush member, each connecting the eccentric circular groove 45 with one of said longitudinal grooves 42, 42—, for ejecting worn and powdered material produced in the gap between the brush member and the current collector, and a plurality of longitudinal holes 48, 48— paralled near the center hollow 43 in the brush member defining air inlet, each of which is opened at one of said radial grooves 46, 46—.

Figure 4:
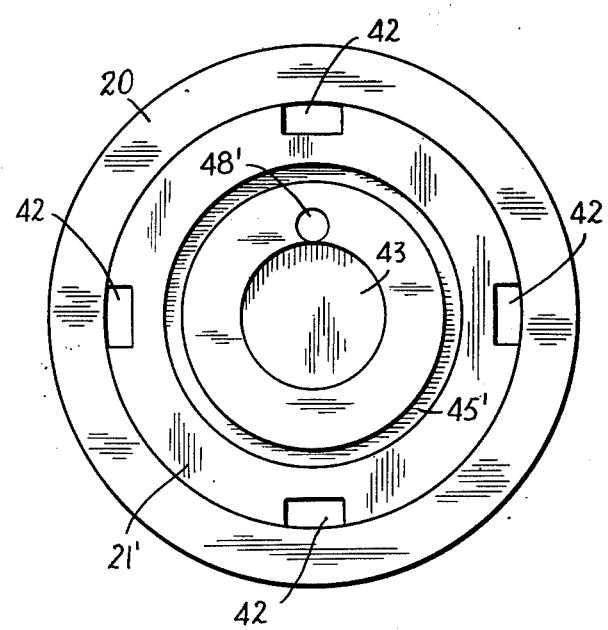
FIG. 4 shows a sectional view of the current collector and brush member according to another embodiment of the invention.

Referring to FIG. 4 which shows another embodiment of air circulating pathes in the combination of the current collector and the brush member, numeral 21' designates a brush member similar to that 21 in FIGS. 2 and 3, in which a circular groove 45' is concentric to the center hole 43 on the front end surface, radial grooves 46 are emitted, the current collector having radial grooves (not shown in the drawings) on the contact end surface thereof, oblique through holes 47 are also emitted, and a longitudinal hole 48' has replaced the holes 48.

It is apparent that in the spindle assembly of the present invention, the small gaps between the spindle housing and the bearing holders which support the spindle, are filled with moulded thermosetting resin or the like poured therein, combining the bearing holder and the housing in a unitary body and insulating them from each other. Any gap or space is perfectly eliminated, while the moulded layer is much thinner than the conventional insulators, so that the bearing holders are fixed steady on the spindle housing with higher rigidity, making high rigid spindle support and reliable electric insulating on the spindle assembly. Furthermore, it is easy for workers to assemble the spindle accurately.

The operation will be illustrated hereinafter. The high frequency motor drives the spindle 6 to rotate at high speed and sufficient electric current is supplied to the spindle 6 through the brush member 21 and the current collector 17, so that electrolytic grinding is performed. Oil-mist is supplied to the main path 28 from the oil-mist hose 29, jetting out from the nozzles 33 and 36 to lubricate and to cool the ball bearings 7 and 15, and is, then, ejected out through outlet pathes in the housing 1, which are not shown in the drawings. Oil-mist in the main path, further, jets toward the current collector 17 from the nozzle 37 to cool the current collector 17 and the brush member 21, and is, then, ejected out through the longitudinal grooves 42, 42 —.

By rapid flow of oil-mist in the longitudinal grooves 42, 42 —, negative pressure is caused to occur in the through holes 47, so that air in the eccentric circular groove 45 and in the hollow 43 is sucked to the longitudinal grooves 42, 42— through the holes 47, 47 —, outside air being sucked into the groove 45 and the hollow 43 through the longitudinal holes 48, 48 — in succession. Thus, there occurs continuous air circulation passing the grooves and holes in the brush member 21.

Worn and powdered material of the brush member by the slipping friction between the current collector 17 and the brush member 21 is mixed into the air flow and is also ejected out through the holes 47, 47 — and then, through the longitudinal grooves 42, 42 —.

In case of FIG. 4, high speed rotation of the current collector 17 with the spindle 6 generates centrifugal pumping action in the radial grooves, circulating air and ejecting wear material.

Radiation fins on the current collector 17 and the brush holder 18 are effective to reduce temperature rise of them against so heavy friction and current heating.

Eccentric groove 45 on the brush member 21 effects even wear of the contact surfaces of the brush member and the current collector. This eccentric groove may be placed on the current collector surface when the spindle rotation speed is not so high as spindle ballance is severe.

Therefore, with the present invention, good electric power supply for the electrode spindle with high reliability is assured, preventing the brush device from poor electric conductivity caused by the worn material stagnation or oil film in the slipping area.

Dry air supply may be of better use for the cooling of the current collecter and the brush member in stead of oil mist when superior conductivity is needed therebetween.

We claim:

1. A spindle assembly for electrolytic grinders and others which use electric current through rotating spindles, comprising an electrode spindle supported rotatably in a housing, said spindle being insulated from the housing, an electric current collector securely fixed on the rear end of said spindle, a slipping brush member spaced behind said electric current collector and being in contact with the collector, said brush member being also insulated from the housing and connected to an electric supply during use of the spindle assembly, and means including air circulating paths formed in the combination of said electric current collector and said slipping brush member for sucking air from outside to circulate through the paths returning to the outside, so that wear material from the brush member is ejected out together with the circulating air.

2. A spindle assembly claimed in claim 1, further comprising a second air path for cooling the combination of said electric current collector and said slipping brush member passing the circumference of said combination from air supply to outside.

3. A spindle assembly claimed in claim 2, the cooling air path has an outlet to outside which is provided with a check valve so as to prevent backward air flow.

4. A spindle assembly claimed in claim 1, wherein said air circulating pathes include radial grooves on the contact surface of said electric current collector to generate an air circulating force by means of the centrifugal force caused by the spindle rotation.

5. A spindle assembly claimed in claim 2, wherein said air circulating pathes, near the end thereof, join in said cooling air path, so that cooling air flow sucks air in the circulating pathes.

6. A spindle assembly claims in claim 1, wherein said air circulating paths include a ring groove eccentric to the spindle axis on the contact surface of either the collector or the brush member.

7. A spindle assembly claimed in claim 2, further comprising metalic radiation fins surrounding said brush member and protruding toward the cooling air path through which cooling air is forced to flow.

8. A spindle assembly claimed in claim 2, said electric current collector has radiation fins on the periphery thereof, said fins being exposed to the cooling air flow.

9. A spindle assembly claimed in claim 1, wherein said spindle is supported by bearing holders which are insulated with synthetic resin layer moulded into the gaps between the bearing holders and the housing.

10. A spindle assembly claimed in claim 9, wherein said synthetic resin layer spreads to cover over adjacent area to the boundary between the bearing holders and the housing.

11. A spindle assembly claimed in claim 1, wherein an air or oil-mist outlet is opened toward the spindle periphery at the front end portion thereof.

* * * * *